United States Patent [19]
Watanabe et al.

[11] Patent Number: 6,122,327
[45] Date of Patent: Sep. 19, 2000

[54] RADIO RECEIVER

[75] Inventors: Hidekazu Watanabe, Tokyo, Japan; Hamid Amir-Alikhani, Leonberg, Germany

[73] Assignees: Sony Corporation, Tokyo, Japan; Sony United Kingdom Limited, Weybridge, United Kingdom

[21] Appl. No.: 08/796,067

[22] Filed: Feb. 4, 1997

[30] Foreign Application Priority Data

Jan. 30, 1996 [GB] United Kingdom ............... 9601873

[51] Int. Cl.$^7$ ................................................. H03K 9/00
[52] U.S. Cl. ........................................ 375/316; 375/354
[58] Field of Search ................................ 375/316, 359, 375/368, 208, 200, 206, 354

[56] References Cited

U.S. PATENT DOCUMENTS

| | | | |
|---|---|---|---|
| 4,697,277 | 9/1987 | Van Rassel | 375/116 |
| 4,748,623 | 5/1988 | Fujimoto | 370/100 |
| 5,305,347 | 4/1994 | Roschmann et al. | 375/1 |
| 5,347,548 | 9/1994 | Messenges et al. | 375/116 |
| 5,375,141 | 12/1994 | Takahashi | 375/1 |
| 5,420,895 | 5/1995 | Kim | 375/373 |
| 5,502,749 | 3/1996 | Ozaki | 375/368 |
| 5,615,232 | 3/1997 | Van Nee | 375/346 |
| 5,651,030 | 7/1997 | Wong et al. | 375/316 |

FOREIGN PATENT DOCUMENTS

| | | |
|---|---|---|
| 0 551 803 | 7/1993 | European Pat. Off. |
| WO 91 10305 | 7/1991 | WIPO . |

*Primary Examiner*—Stephen Chin
*Assistant Examiner*—Mohammad Ghayour
*Attorney, Agent, or Firm*—Frommer Lawrence & Haug, LLP; William S. Frommer; Gordon Kessler

[57] ABSTRACT

A radio receiver for a digital cellular system or the like which transmits or receives, for example, voice signals by coding them, and easily and reliably detects a synchronizing signal. A synchronizing signal FCCH is detected by converting a base band converted transmitted signal with an analog-to-digital convertor circuit 17, and then by detecting a correlation value with a predetermined reference signal.

17 Claims, 6 Drawing Sheets

|    | I  | Q  |
|----|----|----|
| t0 | 1  | -1 |
| t1 | 1  | 1  |
| t2 | -1 | 1  |
| t3 | -1 | -1 |

| ACC | I | Q |
|---|---|---|
| 0 x 00 | 0 | 0 |
| 0 x 40 | 0 | 0 |
| 0 x 80 | 1 | 0 |
| 0 x c0 | 1 | 1 |
| 0 x 00 | 0 | 1 |
| 0 x 40 | 0 | 0 |
| 0 x 80 | 1 | 0 |
| 0 x c0 | 1 | 1 |

⟩ Repeat

RADIO RECEIVER

BACKGROUND OF THE INVENTION

1. Field of the Invention

This invention relates to a radio receiver, and is applicable for example, to a digital cellular system transmitting and receiving voice signals by coding them.

2. Description of the Related Art

Conventionally, a digital cellular system, a kind of radiotelephony, is designed to allow a plurality of terminals to simultaneously use one channel through a time division multiplex approach by coding voice signals for transmitting and receiving.

That is, when it is turned on, such a type of terminal sequentially scans received frequencies in a predetermined number of channels, for example, 124 channels, and detects FCCH (frequency correction channel) which is inserted in the channel at a predetermined cycle (typically, consisting of 10 or 11 frames) in the sequence of stronger field strength, to recognize the channel including the FCCH as control channel.

Then, the terminal detects and receives a control channel assigned to the area to which it belongs.

The control channel is designed to form a time slot for the transmission of various information, whereby, in the digital cellular system, each terminal receives the control channel in order to receive information such as information on a base station sending the control channel, information on an adjacent base station, and information for calling the terminal.

To this end, the terminal corrects the processing timing based on this FCCH, and roughly detects timing for sending out necessary information.

Here, FCCH is a synchronizing signal assigned with a bit pattern in which, when it is decoded, data of value "0" continues for a predetermined number of bits. In the digital cellular system, the bit pattern is differential coded and then GMSK (Gaussian filtered minimum shift keying) modulated for transmission.

Thus, as shown in FIG. 1, the FCCH is transmitted as a combined wave of I and Q signals the signal level of which varies in a sine wave with a phase difference of 90°. In a control channel, a carrier frequency offsets by +67.7 [kHz] while sending out the FCCH.

Thus, the digital cellular system is arranged to detect the timing of FCCH by extracting signal components of the FCCH from a received signal with a band pass filter, and to roughly synchronize the entire operation with the control channel based on the detection result of the timing.

In such case where the signal components of FCCH is extracted by using the band pass filter, the narrower the band width of the band pass filter is, the higher the detection accuracy is improved.

However, if the band width is made narrower, the response characteristics of the band pass filter tend to deteriorate.

On the other hand, such a digital cellular system is characterized by that the duration of FCCH is as short as 550 [usec] so that, if the response characteristics of the band pass filter deteriorate, it becomes difficult to find the FCCH.

In addition, in the digital cellular system, there may be a case where the frequency is displaced by doppler shift, or where a carrier frequency has the same frequency spectrum as the offset FCCH in a data other than the FCCH so that, when the band pass filter is used, there is such a problem that the timing of FCCH is erroneously detected or cannot be detected at all.

Thus, if the timing of FCCH is erroneously detected or cannot detected at all, detection is tried again for FCCH which is repeatedly transmitted at a predetermined cycle so that, in the digital cellular system, time is required until a call is made possible.

On the other hand, there is a method to detect FCCH from a decoded data stream.

That is, if the FCCH is formed by a data stream of value "0", it can be detected by detecting the correlation between a demodulated data stream and a data stream with consecutive "0" values.

However, in such a digital cellular system, the result of decoding may be mistaken because of noise or fading in addition to the doppler shift.

Particularly, for the noise level, there may be a case where Eb/NO (Eb: transmission energy per bit, NO: power intensity of noise) deteriorates to 10 [dB] or less. In such a case, the demodulated data stream has a higher rate of error so that the FCCH cannot be properly detected.

On the other hand, an approach may be considered in which I and Q signals are generated by orthogonally detecting the received signal, the correlation between the I and Q signals being detected by utilizing the fact that they have phase difference of 90° in the FCCH, thereby detecting the FCCH.

However, because, as described above, there may be a case where it has high correlation between other than sine wave in a slot other than the FCCH, erroneous detection may be caused even if the correlation between the I and Q signals is detected.

SUMMARY OF THE INVENTION

In view of the foregoing, an object of this invention is to provide a radio receiver which can easily and reliably detect such synchronizing signals.

The foregoing object and other objects of the invention have been achieved by the provision of a radio receiver for receiving a transmitted signal with reference to a synchronizing signal FCCH with a predetermined pattern interposed into the transmitted signal at a predetermined cycle and decoding a radio transmitted data stream, comprising: a detector means 15 for converting the transmitted signal into a base band signal; a data demodulator circuit 16 or 17 for demodulating the base band signal and outputting the data stream; an analog-to-digital convertor circuit 16 for sequentially sampling the base band signal at a predetermined cycle and outputting a sampled data stream; a reference signal generator means 17 for generating a predetermined reference data stream; and a correlation detector means 17 for detecting correlation between the sampled data stream and the reference data stream and outputting a result of correlation detection, wherein the synchronizing signal FCCH is detected based on the result of correlation detection, the data stream being received basing on the result of detection.

In addition, according to the second invention, a radio receiver 1 for receiving a transmitted signal in reference to a synchronizing signal FCCH with a predetermined pattern interposed into the transmitted signal at a predetermined cycle and decoding a radio transmitted data stream, comprising: a detector means 15 for converting the transmitted signal into a base band signal; a data demodulator circuit 16 or 17 for demodulating the base band signal and outputting a data stream; an analog-to-digital convertor circuit 16 for sequentially sampling the base band signal at a predetermined cycle and outputting a sampled data stream; reference signal generator means 25A and 25B for generating first and second reference data streams obtained by sampling a reference signal with a predetermined phase with the first and second sampling frequencies; and correlation detector means 25A, 25B, and 25C for detecting correlation between the sampled data stream and the first reference data stream and correlation between the sampled data stream and the second reference data stream, and outputting the results of the first and the second correlation detection, wherein the synchronizing signal FCCH is detected based on the result of the first and second correlation detection, the data stream being received based on said results of detection.

Furthermore, according to the third invention, the reference signal generator means 17 generates the reference data stream, or the first and second reference data streams by sequentially reading in a predetermined order the data stored in a predetermined storage means.

Furthermore, according to the fourth invention, the reference signal generator means 17 has an adder 20 or 21 which cumulatively adds a predetermined constant in the processing cycle of the analog-to-digital convertor circuit 16, and outputs predetermined bits in the adder 20 or 21 to output the predetermined bits output in the processing cycle as the reference data stream, or the first and second reference data stream.

Furthermore, according to the fifth invention, the reference signal generator means 17 cumulatively adds constants with different values to generate the first and second reference data streams.

Furthermore, according to the sixth invention, the correlation detector circuit 17 sequentially multiplies the sampled data stream and the reference data stream to obtain a multiplied value $C_m$, or sequentially multiplies the sampled data stream and the first reference data stream, or the sampled data stream and the second reference data stream, respectively, to obtain multiplied values $C_m$, detects a correlation value $CORR_k$ by accumulating the multiplied valued $C_m$ in a predetermined duration, and outputs the result of correlation detection or the results of the first and second correlation detection by normalizing the correlation value $CORR_k$ with signal energy $P_{REC}$ of the transmitted signal as received.

Furthermore, according to the seventh invention, the radio receiver 1 determines the synchronizing signal FCCH to be detected when the result of correlation detection consecutively rises to a predetermined value or more for a predetermined duration.

The synchronizing FCCH can be surely detected even if an error is generated in a decoded data stream by sequentially sampling base band signals at a predetermined cycle to generate a sampled data stream, and by detecting the correlation between the sampled data stream and the reference data stream.

In this case, if the correlation is detected by the first and second reference data streams with different frequencies, the synchronizing signal FCCH can be detected in a short period of time even if the frequency of an internal clock is displaced.

In this case, the reference data stream can be easily generated by sequentially reading and outputting the data stored in a storage means and by cumulatively adding predetermined constants to output a data stream of predetermined bits. In addition, the first and second reference data can be easily generated by cumulatively adding constants with different values.

When added values $C_m$ are obtained from the sampled data stream and the reference data stream, a correlation value $CORR_k$ is detected by accumulating the added values $C_m$ in a prescribed duration, and the correlation value $CORR_k$ is normalized by signal energy $P_{REC}$ of the transmitted signal as received, the synchronizing signal FCCH can be reliably detected even if the field intensity varies because of changes in the receiving conditions. In addition, the accuracy of detection can be improved by determining that the synchronizing signal FCCH is detected when the result of correlation detection consecutively rises to a predetermined value or more for a predetermined duration.

As described above, according to this invention, a radio receiver can be obtained which can reliably detect a synchronizing signal by converting a base band converted received signal to a digital value, and detecting a correlation value with a predetermined reference signal while effectively avoiding effects of noise or fading.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First embodiment (1-1) General Configuration of the Embodiment

Figure 2:
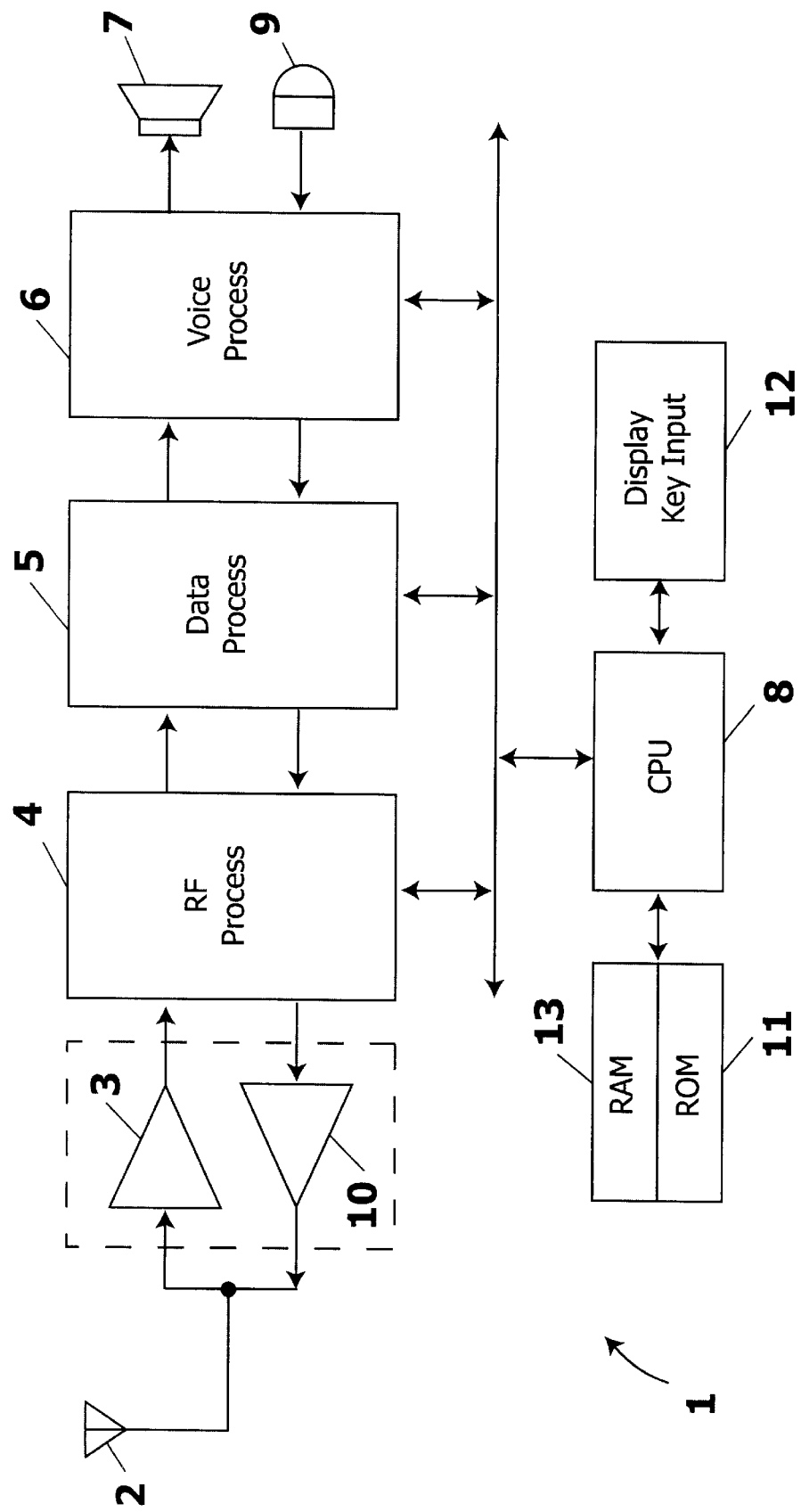
FIG. 2 is a block diagram illustrating a terminal of digital cellular according to one embodiment of this invention.

Referring to FIG. 2, 1 generally denotes a terminal of a digital cellular system, which receives a transmitted signal sent out from a base station with its antenna 2, and outputs the received signal thus obtained to an amplifier circuit 3 through an antenna coupler (not shown).

In this case, the amplifier circuit 3 amplifies the received signal with a predetermined gain, and then outputs it to an RF processing circuit (RF processor) 4. The RF processing circuit 4 frequency converts the received signal by using a predetermined local oscillation signal, the terminal 1 thereby being arranged so as to selectively receive a desired channel by switching the frequency of the local oscillation signal.

Moreover, the RF processing circuit 4 orthogonally detects the frequency converted received signal to demodulate an I signal which is in synchronization with the reference phase of the received signal, and to demodulate a Q signal. It samples these I and Q signals in its built-in analog-to-digital convertor circuit at a predetermined cycle to convert them to digital values.

Thus, the terminal 1 demodulates I data consisting of a result of demodulation corresponding to the reference phase of the received signal, and Q data, and outputs this I and Q data to a data processing circuit 5.

The data processing circuit 5 is composed of a digital processor which processes the I and Q data, and is designed to demodulate original differential coded data from the I and Q data. At the moment, it outputs the differential coded data after waveform equalization and correction of distortion by a built-in Viterbi equalizer so as to reduce the effects of fading and multipath.

In addition, at the moment, the data processing circuit 5 detects the FCCH with reference to the I and Q data, and detects a frequency error based on the result of detection. This result of detection is used as a reference to control operations of the data processing circuit 5, a predetermined reference signal generator circuit, or the like, thereby attaining frame synchronization with the base station and correcting the frequency drift of the internal clock to the base station.

In addition to this system of processing, the data processing circuit 5 differential decodes the differential coded data, then processes error correction, and selectively outputs the decoded data thus obtained to an voice processing circuit 6 or a central processing unit 8.

Here, the voice processing circuit 6 decodes voice data by voice expanding the decoded data, and converts the voice data into an voice signal by a built-in digital-to-analog convertor circuit. The voice processing circuit 6 also drives a speaker 7 with the voice signal, thereby the terminal 1 being capable of receiving the voice signal of a caller sent out from the base station.

On the other hand, the central processing unit 8 is designed to receive predetermined information sent out from the base station based on the decoded data, to switch the frequency of a local oscillating signal based on the result of reception, the transmission/receiving frequency thereby being switched to a predetermined speech channel, and the terminal 1 thereby being capable of transmitting/receiving voice signals by selecting a predetermined speech channel.

On the other hand, the transmission system of the terminal 1 converts voice signals output from a microphone 9 into voice data with the voice processing circuit 6, and then voice compresses them.

The data processing circuit 5 performs differential coding on the output data of the voice processing circuit 6 by adding error correction codes, as well as performs differential coding on various control codes output from the central processing unit 8 in place of the output from the voice processing circuit 6 by adding error correction codes.

The RF processing circuit 4 generates a transmitting signal by GMSK modulating the differential coded data output from the data processing circuit 5, and frequency converts the transmitting signal to a predetermined frequency.

In addition, the RF processing circuit 4 outputs the frequency converted transmitting signal to the antenna 2 through the amplifier circuit 10, thereby the terminal 1 being capable of transmitting voice signals of a caller or calling signals to the base station.

At this time, the terminal 1 switches the timing for transmission and reception basing on a predetermined detection result detected by the data processing circuit 5. Thus, by applying the time division multiplex approach, it can selectively receive a time slot assigned to it from signals transmitted to a plurality of terminals from the base station, and can transmit voice data or the like to the base station by selectively using the time slot assigned to it.

To this end, the central processing unit 8 is designed to execute a processing program stored in a read-only memory circuit (ROM) 11 by assuring a work area in a random access memory (RAM) 13, thereby controlling the operation of the entire system by outputting control codes to each circuit block as required. For example, when a predetermined operator on a display/key entry section 12 is pressed, a calling signal is sent out to the base station in response to such an operation, and when a calling signal from the base station enters, the receiving channel or the like is switched.

(1-2) Processing of Input Data

Figure 3:
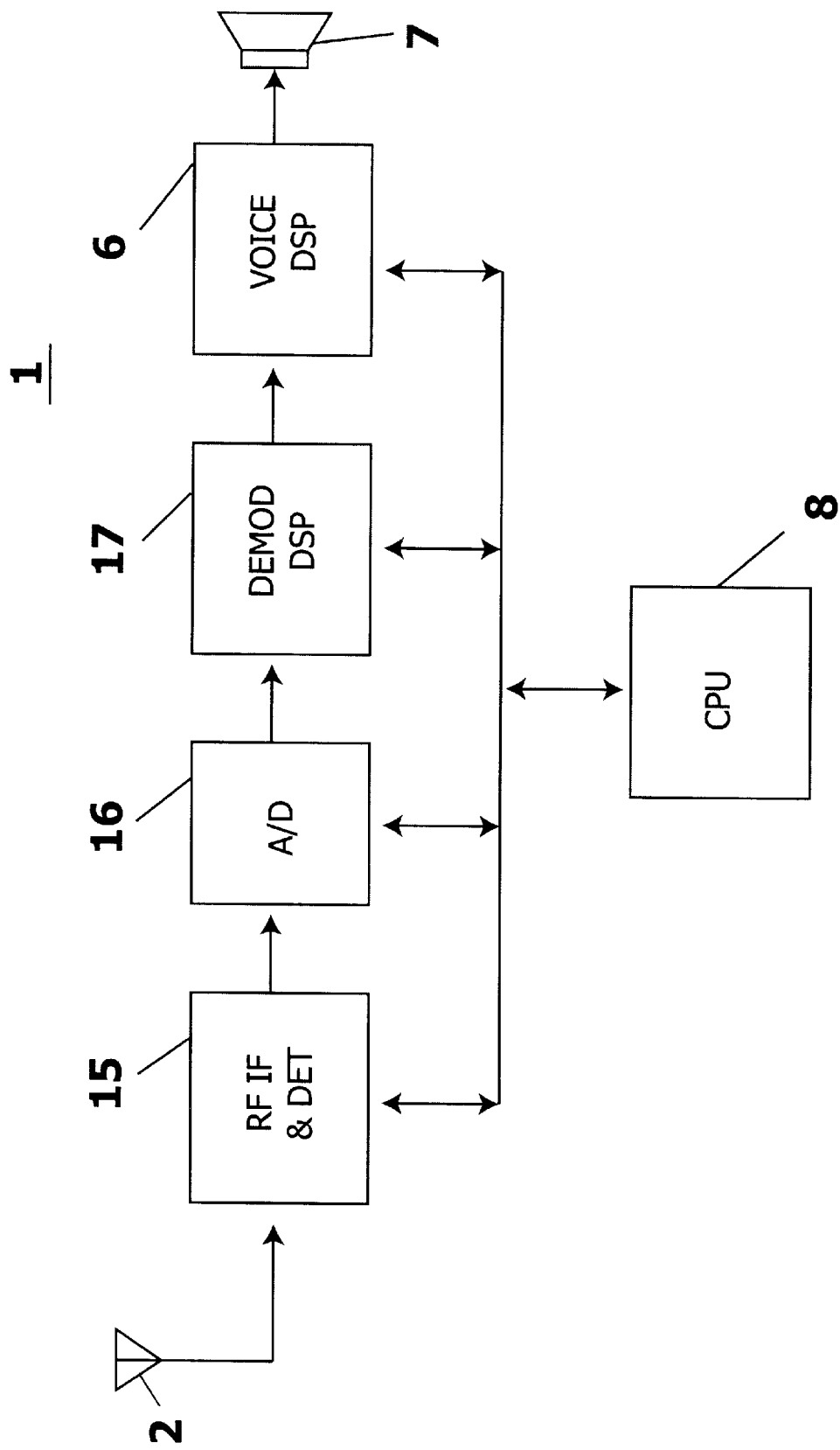
FIG. 3 is a block diagram illustrating its receiver section.

Here, the terminal 1 received with its receiving system as shown in FIG. 3 a signal transmitted from the base station.

That is, the terminal 1 constitutes the RF processing circuit 4 with a selector circuit (RF), an intermediate frequency circuit (IF), a detector circuit (all of which are denoted by a reference 15) and an analog-to-digital convertor circuit 16 to selectively receive a desired channel by switching the frequency of local oscillating signal, to convert and amplify the received signal to an intermediate frequency signal, and to orthogonally detect the intermediate frequency signal.

Thus, the terminal 1 is designed to convert and process the signal received by the antenna 2 into the base band signal by generating the I and Q signals which are generated in the GSMK modulation at a transmitter.

On the other hand, the analog-to-digital convertor circuit (A/D) 16 converts the I and Q signals to digital values to generate I and Q data, and the data processing circuit 5 decodes the I and Q data to the original data stream with its built-in demodulator (DEMOD) and digital signal processor (DSP) (which are denoted by a reference 17).

At the moment, the digital signal processor detects the FCCH based on the I and Q data, and performs equalization of the received signal and error correction to the decoded data stream.

On the other hand, the voice processing circuit 6 is composed of a digital signal processor for processing voice data (VOICE DSP) in which the output data from the data processing circuit 5 is data expanded so that the voice compressed transmitted data is voice expanded and converted into the original data stream. The data stream is converted into analog signals to drive the speaker 7.

Prior to starting such a processing procedure, the terminal 1 receives a control channel first for frame synchronization with reference to the FCCH.

In addition, the terminal 1 detects errors in the frequency of the internal clock with reference to the FCCH to correct a frequency difference, synchronizes the entire operation with reference to predetermined burst, and then receives desired information by receiving a time slot.

In this case, the data processing circuit 5 detects a correlation value between the I and Q data and a predetermined reference signal in place of the conventional data stream after demodulation, thereby detecting the FCCH.

Thus, when the data processing circuit 5 detects the timing of the FCCH, it sets a built-in time base counter, thereby frame synchronizing the entire operation.

That is, in the terminal 1, the analog-to-digital convertor circuit 16 generates eight bits of I and Q data, respectively, by sampling one time the I and Q signals one bit by one bit.

Figure 1:
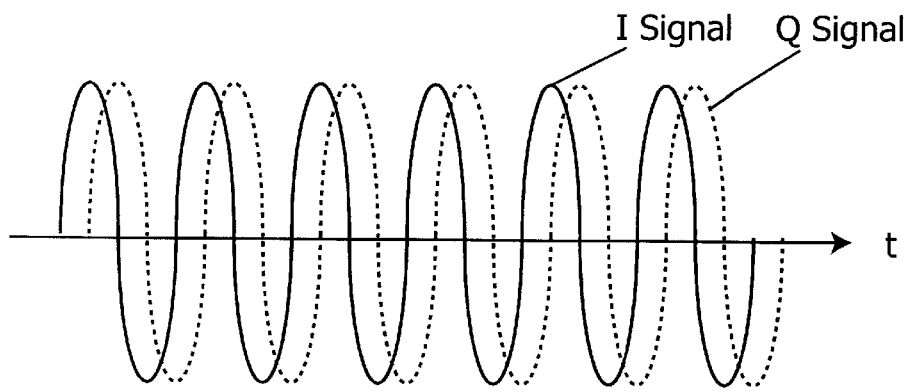
FIG. 1 is a waveform for explaining the transmission of the FCCH.
Figure 4:
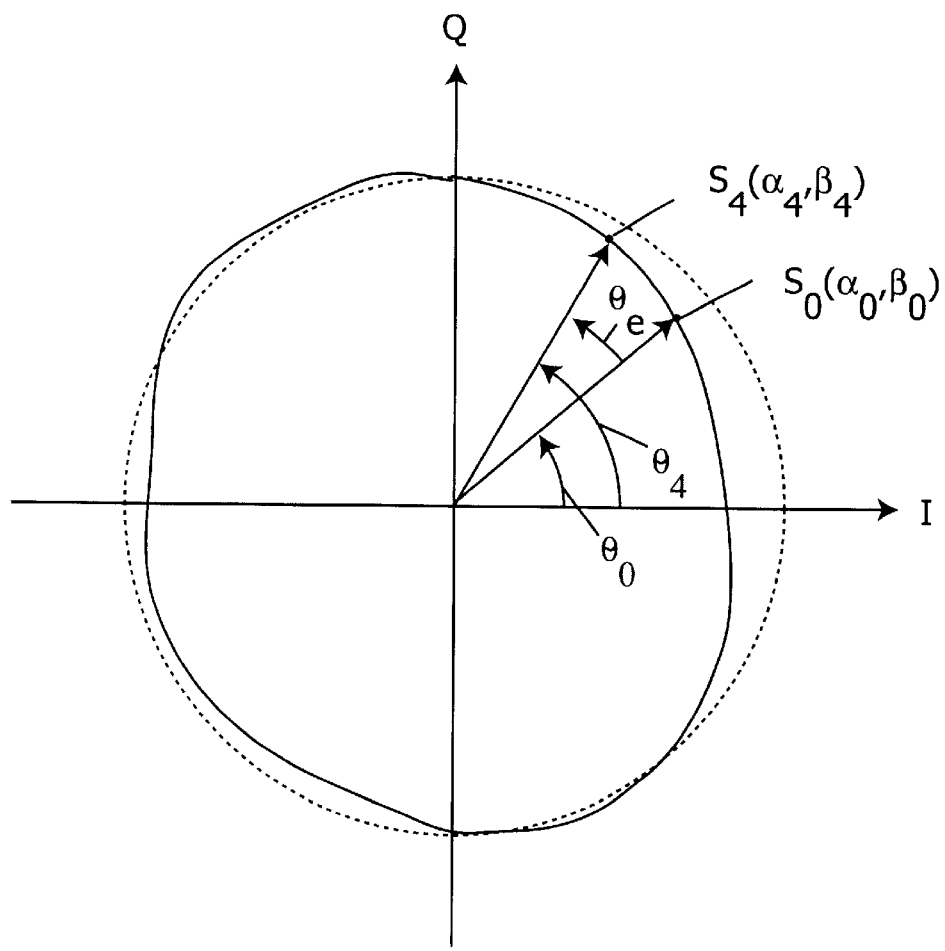
FIG. 4 is a graph for explaining its operation.

Here, as the I and Q signals transmitting the FCCH are formed with a phase difference of 90°, if the I and Q signals are sampled by the analog-to-digital convertor circuit 16 at a timing synchronous with the I and Q signals, as shown in FIG. 4, the resultant I and Q data forms a circular locus rotating counterclockwise by the $\pi/2$ radian on a complex plane.

On the other hand, if the FCCH is affected by fading or noise, the amplitude and phase of the I and Q signals are varied by that amount so that the circular locus is formed for the I and Q data with distortion.

In addition, in a case where, in the terminal 1, the internal clock does not properly synchronize the FCCH, a phase error $\theta e$ is generated between the I and Q data S0 ($\alpha 0$, $\beta 0$) and S4 ($\alpha 4$, $\beta 4$) which are originally matched with each other for every four samplings.

Figures 5, 6:
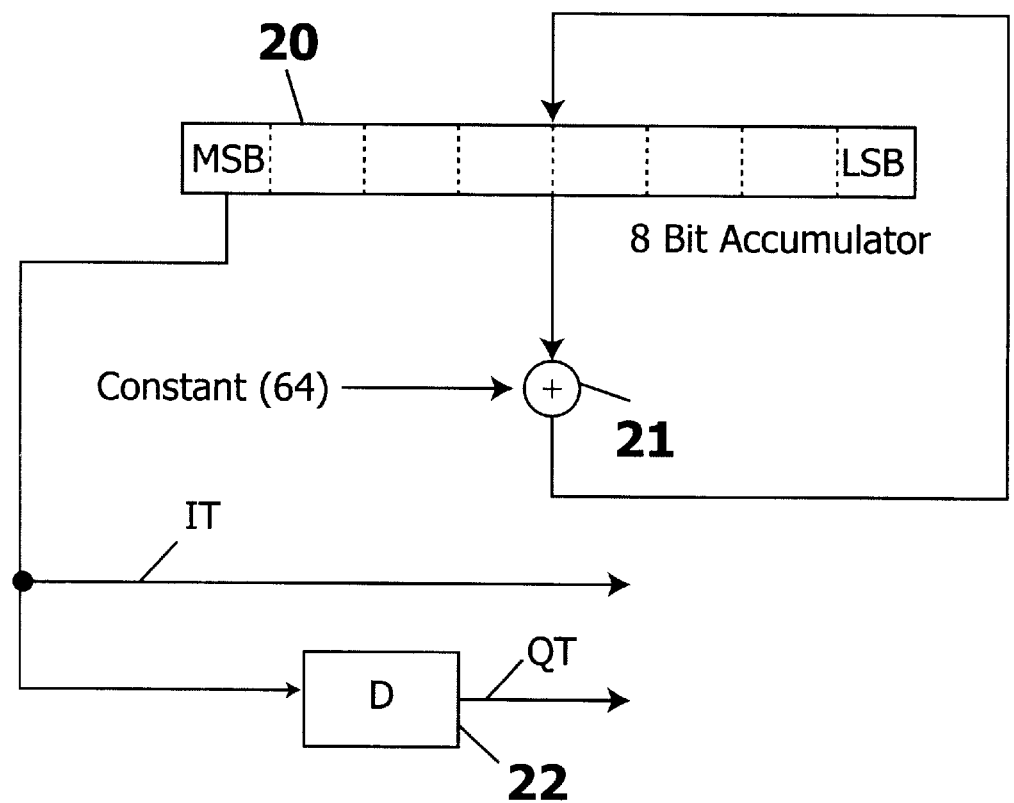
FIG. 5 is a table showing a reference pattern for detecting the FCCH.
FIG. 6 is a block diagram illustrating the second embodiment.

Thus, it is appreciated that, if there is no effect of fading or noise in time synchronizing the FCCH, the FCCH can be represented by an one-bit bit pattern in correspondence to the I and Q data as shown in FIG. 5.

Thus, the data processing circuit 5 uses this bit pattern as a reference pattern to generate a reference signal (that is, consisting of a template) by sequentially reading data forming the bit pattern from a memory circuit.

Furthermore, the data processing circuit 5 represents the I and Q data as $I_m$ and $Q_m$ (sample$_m$), and the values of the template as $T_{im}$ and $T_{qm}$ (template$_m$) in complex conjugate numbers, sets the length of correlation to n (that is, consisting of number of data for detecting the correlation), and represents an intermediate value $C_m$ for calculation by the following equation:

$$C_m = \text{sample}_m * \text{template}_m \quad (1)$$
$$= (I_m + jQ_m)(T_{im} - jT_{qm})$$
$$= (I_m T_{im} + Q_m T_{qm}) + j(Q_m T_{im} - I_m T_{qm})$$

(here, * represents multiplication of a complex number)

and performs calculation of the following equation to detect the correlation value $CORR_k$:

$$CORR_k = \sum_{m=k}^{k+n-1} C_m = C_k + C_{k+1} + \cdots + C_{k+n-1} \quad (2)$$
$$= CORR_{k-1} - C_{k-1} + C_{k+n-1}$$

here, the total number of terms $C_k, C_{k+1}, \cdots, C_{k+n-1}$ is $n$.

That is, the correlation value $CORR_k$ can be determined at the timing of the FCCH by setting the value of the template to a value equal to the I and Q data for the I and Q data obtained by properly receiving the FCCH.

In this case, even if an error is caused in the data stream after demodulation, the correlation value $CORR_k$ can be determined at the timing of FCCH by selecting the length of correlation n. Thus, the FCCH can be easily and surely detected while effectively avoiding the effect of fading or noise.

In this case, because, for the template, the calculation of equation (1) can be performed by representing it with a bit pattern of logic "1" and "0" in place of the reference pattern of FIG. 5, the calculation can be easily performed.

In addition, the correlation value $CORR_k$ can be detected with simple calculation as a whole by adding and deducting intermediate values $C_{k+n-1}$ and $C_{k-1}$ to and from a correlation value $CORR_{k-1}$, which is obtained for the previous I and Q data by one sample.

Furthermore, the data processing circuit 5 performs the calculation of the equation $$P_{REC} - P_{CORR} \times TH \leq 0 \quad (3)$$

by using the correlation value $CORR_k$ thus obtained, and determines whether or not this relational expression is satisfied. Here, TH represents a threshold value.

Here, $P_{CORR}$ represents the power of the result of correlation detection, and can be detected by obtaining an absolute value of the complex correlation value $CORR_k$ through execution of the calculation of the following equation:

$$P_{CORR} = |CORR_k|^2 \quad (4)$$

$P_{REC}$ represents the energy of the received signal and can be expressed by the following equation:

$$P_{REC} = Ii^2 + Qi^2 \quad (5)$$

Thus, if an affirmative result is consecutively obtained for a predetermined sampling duration for the relational equation (3), the data processing circuit 5 determines that the FCCH is received thereby performing frame synchronization in reference to the result of the timing detection.

That is, when the correlation value $CORR_k$ is detected between the I and Q data, which is thus obtained through conversion to the base band, and the template, the correlation value $CORR_k$ increases not only when the FCCH is received, but also when the amplitudes of I and Q signals increase as the signal level of the received signal increases.

Therefore, the data processing circuit 5 normalizes the result of correlation value detection with the reception power by calculating the equation (3) whereby the FCCH can be reliably detected even if the signal level of the received signal varies (that is, even if the field intensity varies because of change in receiving environment).

In addition, in this normalization, the data processing circuit 5 is designed to be able to perform the normalization with a simple calculation by multiplying the correlation value $CORR_k$ and the threshold value, and then by subtracting it from the received signal energy $P_{REC}$ for normalization so that the FCCH can be more easily detected.

Furthermore, in this case, if affirmative results are consecutively obtained for a predetermined sampling duration, the data processing circuit 5 can improve the detection accuracy of the FCCH by determining that the FCCH is detected.

(1-3) Advantage of the Embodiment

According to the above arrangement, the FCCH is detected based on the result of the correlation value which is found by converting the base band converted I and Q signals into a digital value, and then by detecting the correlation of it with a predetermined reference signal so that the FCCH can be easily and reliably detected while effectively avoiding the effect of fading or nose.

(2) Second Embodiment

In this embodiment, the reference signal is generated by an accumulator 20 as shown in FIG. 6, and the correlation value is detected between this reference signal and the I and Q data.

That is, in this embodiment, the data processing circuit 5 outputs eight-bit data from the accumulator 20, adds this data with a predetermined constant in an adder circuit 21, and then stores the result of addition in the accumulator 20 again.

Thus, the data processing circuit 5 is designed to perform this addition in synchronization with the operation of the analog-to-digital convertor circuit 16, and to output the most significant bit (MSB) in the accumulator as a reference signal IT for the I data.

In addition, the data processing circuit 5 delays the I data reference signal by one sampling cycle in a predetermined delay circuit so as to generate and output a reference signal QT for the Q data from the I data reference signal.

Figures 7, 8:
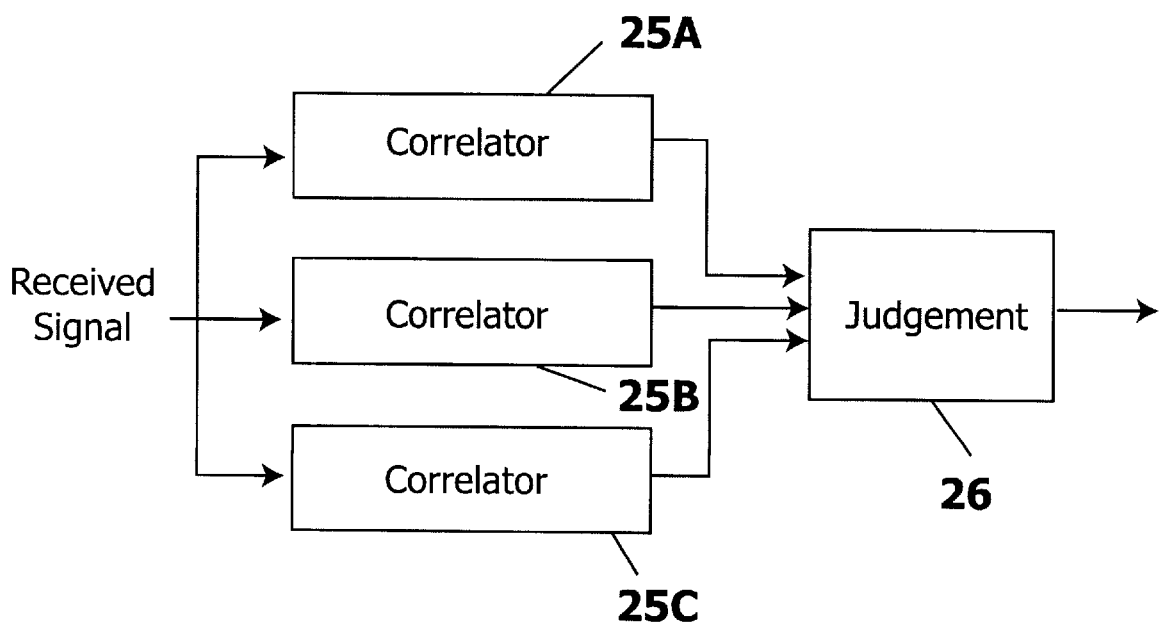
FIG. 7 is a table for explaining its operation.
FIG. 8 is a block diagram illustrating the third embodiment.

Here, in this embodiment, the constant output to the adder circuit 21 is selected to be a value of 64 whereby, as shown in FIG. 7, the data processing circuit 5 cumulatively adds this constant to generate the reference signal so that the reference signal can be generated with a simple arrangement of the accumulator 20 and the adder circuit 21.

Particularly, when the reference signal is generated by cumulatively adding the constant, it is possible to generate a reference signal with a different frequency by changing this constant.

That is, in such a digital cellular system, because the bit rate is selected to be about 271 [kbps], the FCCH is displaced one fourth of it, 67.7 [kHz]. When the constant with the value of 64 is cumulatively added, the reference signal is generated by this frequency of 67.7 [kHz].

However, in practice, there may be a case where the internal clock of the terminal 1 has its frequency drifted to the base station. In this case, even if the constant with the value of 64 is cumulatively added, the cycle of this addition can be different from the base station so that the reference signal is generated with a frequency displaced from the frequency of 67.7 [kHz].

In this case, the terminal 1 cannot detect the FCCH indefinitely.

Therefore, when the FCCH cannot be detected after a predetermined period expires, the central processing unit initialize the content of the accumulator 20 at need, and changes the constant to be cumulatively added.

That is, when the constant is changed from the value of 64 to 63, the change of the most significant bit of the accumulator 20 is delayed from the case of value of 64 by that amount so that the repeating cycle of the reference signal is delayed by 1/64.

Thus, the terminal can easily change the frequency of the reference signal by changing the constant so that, even if the internal clock suffers from frequency drift, the FCCH can be detected. In addition, the frequency drift also can be detected based on the constant when the FCCH is detected.

By the way, when the value of constant is changed from 64 to 63, the frequency of reference signal can be displaced by 271/64=4.2 [kHz].

In addition, the detection accuracy of FCCH also can be switched by changing the threshold value in the equation (3) in place of the constant.

That is, when the threshold value is reduced, it is possible to improve the possibility of finding the FCCH by reducing the value, and to detect the FCCH even if the internal clock has a large frequency error.

However, if the threshold value is reduced as in the above, it can be determined that the FCCH arrives even at a timing other than that for the FCCH so that the detection accuracy for the position of the FCCH is lowered and the following correction for the frequency drift is also deteriorated.

On the other hand, if the correlation value is detected by switching the frequency of the reference signal, the FCCH can be detected without reducing the threshold value so much that both the detection possibility of FCCH and the detection accuracy can be improved.

Thus, in this embodiment, it is arranged that the FCCH is detected by performing the calculation of the equations (1) to (3) between the reference signal thus generated and the I and Q data.

According to the arrangement shown in FIG. 7, it is possible to obtain effects similar to that attained by the first embodiment by cumulatively adding the constant for easily generating the reference signal, and to further reliably detect the FCCH by changing this constant even if the internal clock has frequency drift.

(3) Third Embodiment

When, in the second embodiment, the frequency of the reference signal is switched by changing the constant to be cumulatively added as described above, there is a shortcoming in that much time is ultimately taken for detecting the FCCH.

Therefore, in this embodiment of FIG. 8, reference signals with different frequencies are generated by phase correlators 25A, 25B, and 25C by cumulatively adding constants with different values. Then, the correlators 25A, 25B, and 25C perform calculation of the equation (1) between the I and Q data consisting of the received signal and each reference signal.

A judgment circuit 26 performs calculation of the equations (2) and (3) on the results of calculation of the equation (1) output from the correlators 25A to 25C, respectively, so that the FCCH is detected by concurrently using three reference signals with different frequencies in parallel, thereby detecting the FCCH in a short period of time.

In addition, the judgment circuit 26 outputs the result of FCCH detection to the central processing unit, performs the frame synchronization, and detects from which correlator 25A, 25B or 25C the result of FCCH detection is obtained (that is, to detect the correlator providing the largest correlation value).

Thus, the terminal detects the FCCH, and roughly detects the frequency error so that the detection accuracy for succeeding frequency error can be improved based on the result of detection.

That is, this detection of frequency error is attained by detecting the phase change of I and Q data represented on a complex plane.

In this case, the data processing circuit first corrects the value of I and Q data based on the rough result of frequency error detection obtained in detecting the FCCH, phase rotates the I and Q data by the amount of this frequency error, and performs the primary processing for detecting the frequency error by using the phase rotated I and Q data.

As described, if the frequency error is further detected by using the I and Q data previously corrected for the frequency error, the detection accuracy can be improved when comparing with the direct detection of the frequency error.

According to the arrangement shown in FIG. 8, the detection of correlation value concurrently using a plurality of reference signals with different frequencies in parallel allows it to detect the FCCH in a short period of time as well as to provide the effect attained by the second embodiment.

(4) Fourth embodiment

Figure 9:
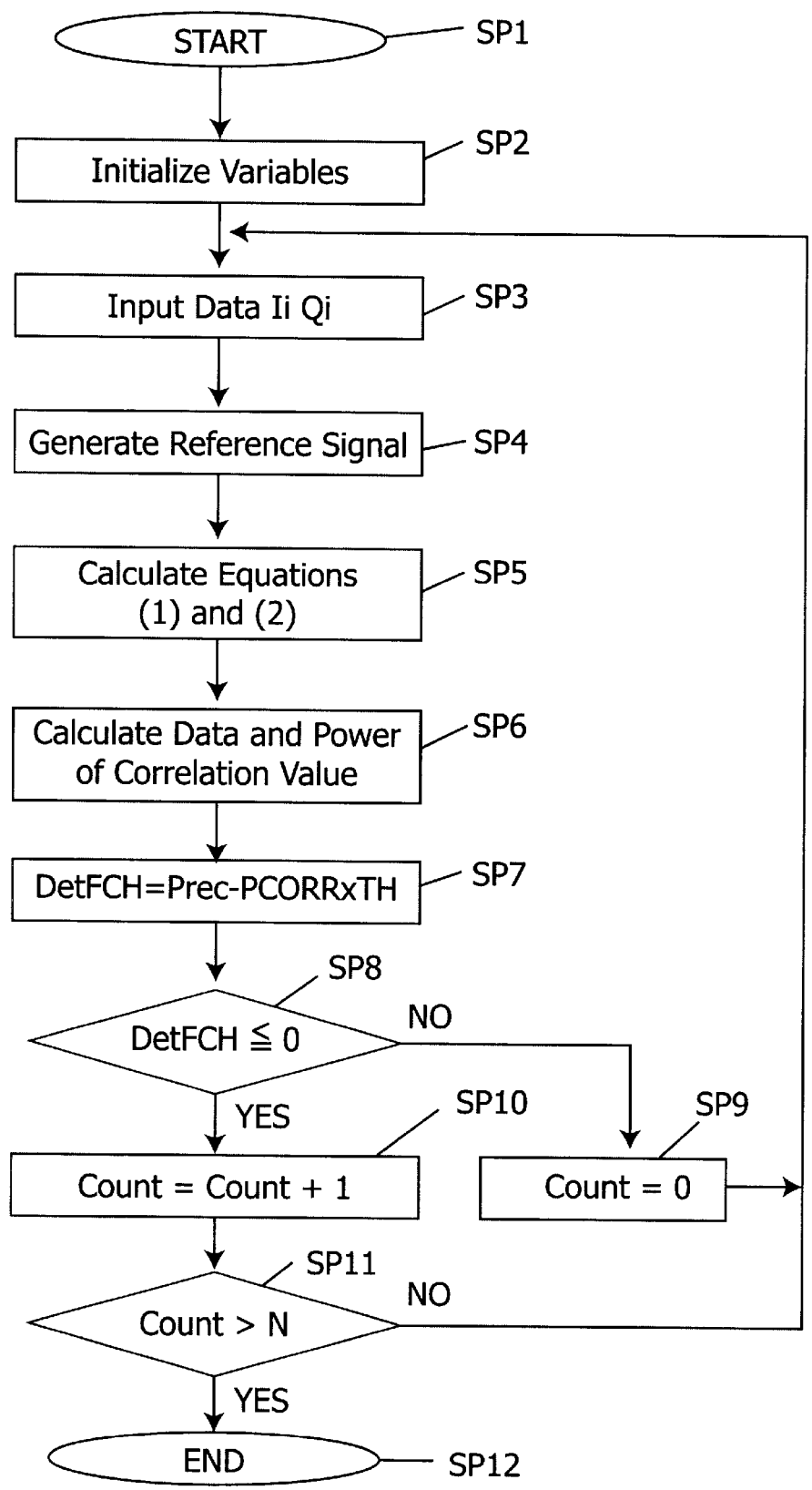
FIG. 9 is a flowchart for explaining the fourth embodiment.

In this embodiment, a reference signal is generated by performing the processing procedure shown in FIG. 9 to cumulatively add a predetermined constant, and the FCCH is detected by using this reference signal.

That is, the data processing circuit 5 enters from the step SP1 to the step SP2 where a counter for counting the number of samples and the cumulative addition are set to a value 0, and the constant is set to a value 64, thereby initializing a variable necessary for detecting the correlation.

Then, the data processing circuit proceeds to the step SP3 where the reference signal for Q data is output by outputting the most significant bit of a cumulatively added value. Then, in the next step SP4, the data processing circuit 5 adds the constant 64 to the cumulatively added value, and outputs the reference signal for I data by outputting the most significant bit of the cumulatively added value.

Then, the data processing circuit proceeds to the step SP5 where the equations (1) and (2) are calculated, and to the step SP6 where the I and Q data and the power of the correlation value are calculated.

Then, the data processing circuit proceeds to the step SP7 where the left side of the equation (3) is calculated, and to the step SP8 where it is determined whether or not the result of calculation is a value 0 or less (that is, whether or not an affirmative result can be obtained from the equation (3)).

If a negative result is obtained at step SP8, the data processing circuit initializes the count value of the counter representing the number of samples in the succeeding step SP9, and returns to the step SP3.

Thus, the data processing circuit repeats the processing procedure of steps SP3–SP4–SP5–SP6–SP7–SP8–SP9–SP3, and proceeds to the step SP10 because an affirmative result is obtained in the step SP8 when I and Q data satisfying the equation (3) is input.

Here, the data processing circuit increments the count value of the counter, and determines in the step SP11 whether the count value reaches a predetermined value N to determine whether or not input data satisfying the result of calculation of the equation (3) is input.

If a negative result is obtained, the data processing circuit returns to the step SP3, while, if an affirmative result is obtained, it determines that the FCCH is detected, and proceeds to the step SP12 to terminate the processing procedure.

According to the arrangement shown in FIG. 9, it is possible to obtain an effect similar to that attained by the first embodiment even if the reference signal is generated by performing calculation.

(5) Other Embodiments

Although the above embodiments are described for a case where the reference signal is generated by cumulatively adding a value 64 as the constant, this invention is not limited to such case, and, if the number of sampling of the I and Q signals is doubled, it is sufficient to set this constant to one half, a value of 32.

In addition, it is possible to make the frequency change of the reference signal fine by increasing the number of bits in the accumulator 20 whereby it is possible to meet a smaller frequency error.

Furthermore, although the above embodiments are described for a case where the reference signal corresponding to the Q data is generated by delaying the reference signal corresponding to the I data, this invention is not limited to such a case, but may generate the reference signal corresponding to the Q data by delaying the reference signal corresponding to the I data by two bits, for example, when the number of sampling of the Q data is doubled by setting the constant to one half value, 32. In addition, the reference signals for I and Q data may be separately generated by separately cumulatively adding the constant.

Furthermore, in this case, it may be possible to set data in the initial phase to the accumulator 20.

Furthermore, although the above embodiments are described for a case where the FCCH is determined as being detected if the calculation of the equation (3) is consecutively satisfied for a predetermined number of times or more, this invention is not limited to such a case, but may relax the criteria, as required. For example, the FCCH may be determined as being detected even if the power is lower than the reference magnitude several times in the predetermined consecutive number of times.

Furthermore, although the above embodiments are described for a case where the correlation value is detected by converting the base band signal obtained through orthogonal detection to the I and Q data, this invention is not limited to such case, but may be extensively applied to such a case where the base band signal is obtained by detecting an intermediate frequency signal with a delay circuit, and the data stream is decoded from this base band signal.

Furthermore, although the above embodiments are described for a case where the correlation value is normalized by subtraction from the received power, this invention is not limited to such case, but may normalize the correlation value by division with the received power.

Furthermore, although the above embodiments are described for a case where this invention is applied to a digital cellular system, this invention is not limited to such a case, but may be extensively applied to a radio receiver which demodulates radio transmitted data streams with reference to a synchronizing signal inserted at a predetermined cycle.

While there has been described in connection with the preferred embodiments of this invention, it will be obvious to those skilled in the art that various changes and modifications may be aimed, therefore, to cover in the appended claims all such changes and modifications as fall within the true spirit and scope of the invention.

What is claimed is:

1. A radio receiver for receiving a transmitted signal in reference to a synchronizing signal FCCH with a predetermined pattern interposed into said transmitted signal at a predetermined cycle said radio receiver comprising;

a detector means for converting said transmitted signal into a base band signal;

a data demodulator circuit for demodulating said base band signal and outputting a data stream;

a reference signal generator means for generating a predetermined reference data stream, said reference signal generator having an adder which cumulatively adds a predetermined constant, a plurality of predetermined bits in said adder being output in the processing cycle as said predetermined reference data stream; and a correlation detector means for detecting correlation between said data stream and said predetermined reference data stream and outputting a result of correlation detection;

wherein the synchronizing signal FCCH is detected based on said result of correlation detection, said data stream being received based on said result of detection.

2. A radio receiver according to claim 1, wherein;
  said reference signal generator means generates said reference data stream by sequentially reading in a predetermined order data stored in a predetermined storage means.

3. A radio receiver according to claim 1, wherein;
  said reference signal generator means generates first and second reference data streams by sequentially reading in a predetermined order data stored in a predetermined storage means.

4. A radio receiver according to claim 1, wherein said reference data stream includes first and second reference data streams.

5. A radio receiver according to claim 4, wherein;
said reference signal generator means cumulatively adds constants with different values to generate said first and second reference data streams.

6. A radio receiver for receiving a transmitted signal in reference to a synchronizing signal FCCH with a predetermined pattern interposed into said transmitted signal at a predetermined cycle said radio receiver comprising:

a detector means for converting said transmitted signal into a base band signal;

data demodulator circuit for demodulating said base band signal and outputting a data stream;

a reference signal generator means for generating a predetermined reference data stream said reference signal generator having an adder which cumulatively adds a predetermined constant, a plurality of predetermined bits in said adder being output in the processing cycle as said predetermined reference data stream; and a correlation detector means for detecting correlation between said predetermined data stream and said reference data stream and outputting a result of correlation detection;

wherein the synchronizing signal FCCH is detected based on said result of correlation detection, said data stream being received based on the result of detection;

wherein said correlation detector circuit sequentially multiplies said data stream and said predetermined reference data stream, to obtain multiplied values Cm, detects a correlation value CORRk by accumulating the multiplied valued Cm in a predetermined duration, and outputs said result of correlation detection by normalizing said correlation value CORRk with signal energy Prec of said transmitted signal as received.

7. A radio receiver for receiving a transmitted signal in reference to a synchronizing signal FCCH with a predetermined pattern interposed into said transmitted signal at a predetermined cycle said radio receiver comprising:

a detector means for converting said transmitted signal into a base band signal;

data demodulator circuit for demodulating said base band signal and outputting a data stream;

a reference signal generator means for Generating a predetermined reference data stream said reference signal generator having an adder which cumulatively adds a predetermined constant, a plurality of predetermined bits in said adder being output in the processing cycle as said predetermined reference data stream; and a correlation detector means for detecting correlation between said data stream and said predetermined reference data stream and outputting a result of correlation detection;

wherein the synchronizing signal FCCH is detected based on said result of correlation detection, said data stream being received based on the result of detection;

wherein said correlation detector sequentially multiplies said data stream and a first reference data stream, or said data stream and said second reference data stream respectively, to obtain multiplied values Cm, detects a correlation value CORRk by accumulating the multiplied valued Cm in a predetermined duration, and outputs said result of the first and second correlation detection by normalizing said correlation value CORRk with signal energy Prec of said transmitted signal as received.

8. A radio receiver according to claim 1, wherein;
said radio receiver determines said synchronizing signal FCCH to be detected when said result of correlation detection consecutively rises to a predetermined value or more for a predetermined duration.

9. A radio receiver for receiving a transmitted signal in reference to a synchronizing signal FCCH with a predetermined pattern interposed into said transmitted signal at a predetermined cycle said radio receiver comprising;

a detector means for converting said transmitted signal into a base band signal;

data demodulator circuit for demodulating said base band signal and outputting a data stream;

reference signal generator means for generating a first and second reference data streams; and correlation detector means for detecting correlation between said data stream and said first reference data stream and correlation between said data stream and said second reference data stream, and outputting results of the first and the second correlation detection: wherein;

said synchronizing signal FCCH is detected based on said result of the first and second correlation detection, said data stream being received based on said results of detection.

10. A radio receiver according to claim 9, wherein;
said reference signal generator means generates each of said first and second reference data streams by sequentially reading in a predetermined order data stored in a predetermined storage means.

11. A radio receiver according to claim 9, wherein;
said reference signal generator means generates said first and second reference data streams by sequentially reading in a predetermined order data stored in a predetermined storage means.

12. A radio receiver according to claim 9, wherein;
said reference signal generator means has an adder which cumulatively adds a predetermined constant; and
a plurality of predetermined bits in said adder is outputted to output the predetermined bits output in the processing cycle as said reference data stream.

13. A radio receiver according to claim 9, wherein;
said reference signal generator means has an adder which cumulatively adds a predetermined constant; and
a plurality of predetermined bits in said adder is outputted to output the predetermined bits output in the processing cycle as said first and second reference data streams.

14. A radio receiver according to claim 13, wherein;
said reference signal generator means cumulatively adds constants with different values to generate said first and second reference data streams.

15. A radio receiver according to claim 9, wherein;
said correlation detector circuit sequentially multiplies said data stream and said reference data stream,
to obtain multiplied values Cm, detects a correlation value CORRk by accumulating the multiplied valued Cm in a predetermined duration, and outputs said result of correlation detection by normalizing said correlation value CORRk with signal energy Prec of said transmitted signal as received.

16. A radio receiver according to claim 9, wherein;
said correlation detector circuit sequentially multiplies said data stream and said first reference data stream, or said data stream and said second reference data stream respectively, to obtain multiplied values Cm, detects a correlation value CORRk by accumulating the multiplied valued Cm in a predetermined duration, and outputs said result of said first and second correlation detection by normalizing said correlation value CORRk with signal energy Prec of said transmitted signal as received.

17. A radio receiver according to claim 9, wherein;

said radio receiver determines said synchronizing signal FCCH to be detected when said result of correlation detection consecutively rises to a predetermined value or more for a predetermined duration.

* * * * *